US008743390B2

(12) United States Patent
Song (10) Patent No.: US 8,743,390 B2
(45) Date of Patent: Jun. 3, 2014

(54) IMAGE FORMING DEVICE AND WEB SERVER PROVIDING WORKFLOW STATUS OF JOB, AND METHOD TO PROVIDE WORKFLOW STATUS OF JOB IN IMAGE FORMING DEVICE AND WEB SERVER

(75) Inventor: Won-ho Song, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1249 days.

(21) Appl. No.: 11/678,850

(22) Filed: Feb. 26, 2007

(65) Prior Publication Data

US 2008/0002220 A1    Jan. 3, 2008

(30) Foreign Application Priority Data

Jun. 28, 2006    (KR) .................. 10-2006-0058526

(51) Int. Cl.
*H04N 1/00* (2006.01)
(52) U.S. Cl.
USPC ........ 358/1.15; 358/1.14; 358/1.13; 715/810; 709/226; 709/201; 709/220
(58) Field of Classification Search
USPC ............. 358/1.14, 1.15, 527; 713/1; 715/745; 400/61; 718/100
See application file for complete search history.

(56) References Cited

U.S. PATENT DOCUMENTS

| | | | | |
|---|---|---|---|---|
| 6,581,097 | B1 * | 6/2003 | Lynch et al. | 709/226 |
| 6,674,540 | B1 * | 1/2004 | Wiechers et al. | 358/1.15 |
| 6,709,176 | B2 * | 3/2004 | Gotoh et al. | 400/61 |
| 7,177,045 | B2 * | 2/2007 | Goel et al. | 358/1.18 |
| 7,536,646 | B2 * | 5/2009 | Singh et al. | 715/745 |
| 7,633,659 | B2 * | 12/2009 | Uotani et al. | 358/527 |
| 7,826,086 | B2 * | 11/2010 | Kato | 358/1.16 |
| 7,991,317 | B2 * | 8/2011 | Kato et al. | 399/81 |
| 8,064,079 | B2 | 11/2011 | Kimura | |
| 2003/0090697 | A1 * | 5/2003 | Lester et al. | 358/1.14 |
| 2003/0188145 | A1 * | 10/2003 | Richardson et al. | 713/1 |
| 2004/0012807 | A1 | 1/2004 | Konishi | |
| 2004/0212821 | A1 | 10/2004 | Kimura | |
| 2010/0031192 | A1 * | 2/2010 | Kong | 715/810 |
| 2010/0073713 | A1 * | 3/2010 | Chae | 358/1.15 |
| 2011/0055832 | A1 * | 3/2011 | Choi | 718/100 |

FOREIGN PATENT DOCUMENTS

| | | |
|---|---|---|
| JP | 11-353131 | 12/1999 |
| JP | 2004-326458 | 11/2004 |
| KR | 2000-51622 | 8/2000 |

OTHER PUBLICATIONS

Korean Office Action dated Sep. 14, 2012 issued in KR Application No. 10-2006-0058526.

* cited by examiner

*Primary Examiner* — Ashish K Thomas
(74) *Attorney, Agent, or Firm* — Stanzione & Kim, LLP (57) ABSTRACT

An image forming device and a web server providing a workflow status of a job and a method of providing the workflow status of the job in the image forming device and the web server are provided. A communicator receives a first workform including a plurality of job conditions necessary to performing the job from a web server connected to the image forming device through a communication network. An image former generates image data of a document to perform the job. A parser parses the first workform. A controller controls the image former to generate a job command including the plurality of job from the parsed first workform and perform the job based on the generated job command, and generates a guidance picture guiding a workflow status of the job whenever the job conditions are processed. A display displays the guidance picture. Thus, a workflow status of a currently performed job can be displayed in real-time so that a user can easily check the workflow status of the currently performed job.

23 Claims, 10 Drawing Sheets

| HONG | | | | |
|---|---|---|---|---|
| ☐ Scan To Folder | 300 dpi | jpg | C:\HONG GIL DONG |
| ☑ Scan To FTP | 600 dpi | jpg | http://192.3.. |
| ☑ Scan To E-Mail | 200 dpi | bmp | ss@se.com |
| ☐ Scan To OCR | 300 dpi | png | C:\HONG GIL DONG |
| ☐ Scan To Printer | 600 dpi | pdf | 192.32..... |

IMAGE FORMING DEVICE AND WEB SERVER PROVIDING WORKFLOW STATUS OF JOB, AND METHOD TO PROVIDE WORKFLOW STATUS OF JOB IN IMAGE FORMING DEVICE AND WEB SERVER

CROSS-REFERENCE TO RELATED APPLICATIONS

This application claims priority under 35 U.S.C. §119(a) of Korean Patent Application No. 10-2006-0058526, filed on Jun. 28, 2006, in the Korean Intellectual Property Office, the entire disclosure of which is hereby incorporated by reference.

BACKGROUND OF THE INVENTION

1. Field of the Invention

The present general inventive concept relates to an image forming device (for example, a printer, a scanner, a fax) and a web server that provide a workflow status of a job, and a method of providing the workflow status of the job in the image forming device and the web server. More particularly, the general inventive concept relates to an image forming device and a web server to display the workflow status of a currently performed job in real-time under each job condition, so that the user can conveniently check the workflow of the currently performed job, and a method of providing the workflow status of the job to the image forming device and the web server.

2. Description of the Related Art

Drivers for image forming devices are installed in host devices, such as personal computers or personal digital assistants (PDAs), so as to use the image forming devices connected to the host devices. The drivers are programs that interface between the image forming devices and the host devices and provide user interface pictures through which users set additional functions and driving methods of the image forming devices, and various functions based on information transmitted from the image forming devices.

For example, if a user puts a paper sheet on a scanner and then requests the scanner to perform scanning, the scanner scans the paper sheet to obtain an image, compresses the scanned image, and transmits the compressed image to the driver of the host device. The scanner also transmits information indicating its performance of the processes of compressing the scanned image and transmitting the compressed image to the driver, and the driver shows the processes on a graph based on the transmitted information. The user recognizes processes of compressing and transmitting the current document by the graph on the host device.

However, a conventional image forming device provides only information on a process of compressing or transmitting a scanned image to the host device, but not additional detailed information regarding the scanned image. Thus, a user frequently will not accurately know the processing status of a currently scanned image.

Also, if the conventional image forming device does not include a display such as a liquid crystal display (LCD), the conventional image forming device does not display a process of processing data by itself. As a result, the user can only check the process through a host device.

SUMMARY OF THE INVENTION

Exemplary embodiments of the present general inventive concept provide an image forming device and a web server to display a workflow status of a currently performed job in real-time under every job condition so that the user can conveniently check the workflow of the currently performed job, and also provide a method of providing the workflow status of the job into the image forming device and the web server.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing an image-forming device including: a communicator that receives a first workform (e.g., a task list), the workform including a plurality of job conditions (i.e., job parameters) necessary to perform a job from a web server connected to the image forming device through a communication network; an image former that generates image data of a document; a parser that parses the first workform; a controller to generate a job command, the job command including the plurality of job conditions from the first workform, and to control the image former to perform the job based on the generated job command, and also to generate user guidance pictures indicating workflow status of the job whenever the job is being processed; and a display to display the guidance pictures.

The controller may control the communicator to transmit the generated guidance pictures to the web server. The web server may generate the guidance pictures as web pages which can be recognized by a user.

If it is determined that the plurality of job conditions include a job condition inexecutable (non-executable) in the image former, according to the result of parsing the first workform, the controller may generate a second workform corresponding to the inexecutable job condition and transmit generated image data and the second workform to the web server.

The image former may include: a scanning unit to generate a scanned image from the document; and a transformer to transform the scanned image into a file having a format of the job conditions of the first workform.

Corresponding jobs may include scanning the document to generate the scanned image, transforming the scanned image into the file, and transmitting the file to the web server.

A guidance picture corresponding to the scanning job may display the scanning status, the resolution and size of the scanned image, and/or the direction (or, orientation) and size of a scanned document, in real-time. A guidance picture corresponding to the transforming job may include transformation status and compression status, the capacity of a file, the name of a transformed file, and/or the like, all in real-time. A guidance picture corresponding to the transmitting picture may display a transmission status, whether the transmission has succeeded, and/or the like, all in real-time.

The job condition that is inexecutable in the image forming device may be, for example, an optical character recognition (OCR) function of transforming the scanned image into a text or a color printing function of the scanned image.

The web server may receive the image data and the second workform, perform the inexecutable job condition generated from the second workform, generate a guidance picture illustrating a workflow status of the inexecutable job condition as a web page, and transmit the web page to the user terminal.

When the inexecutable job condition is processed, the web server may generate a web page displaying contents of the processed inexecutable job condition.

The first and second workforms may be written out in an extensible Markup Language (XML) format.

The foregoing and/or other aspects and utilities of the present general inventive concept are achieved by providing a web server providing a workflow status of a job, including: a workform generator to generate a first workform including a plurality of job conditions necessary to performing a job; a communicator to transmit the first workform to an image forming device; a data processor to receive image data and a second workform including any job condition inexecutable in the image forming device from the image forming device through the communicator, parse the second workform; and perform the inexecutable job condition; a web page generator to generate a web page to display a workflow status of the inexecutable job condition in real-time whenever the inexecutable job condition is processed; and a server controller to control the communicator to provide the web page to a user terminal which has requested the job.

The foregoing and/or other aspects and utilities of the present general inventive concept are achieved by a method of providing the workflow status of a job in an image forming device, including: receiving a first workform including a plurality of job conditions necessary to perform a job from a web server through a communication network; if generation of image data of a document is requested, parsing the first workform and performing a job related to the generation of the image data based on the parsed first workform; and generating and displaying a guidance picture guiding a workflow status of the job.

The method may further include transmitting a guidance picture generated whenever the job is processed to the web server. The web server may generate the guidance picture as a web page which can be recognized by a user and transmit the web page to a user terminal.

If it is determined that the plurality of job conditions include a job condition inexecutable in the image forming device, according to the result of parsing the first workform, the method may further include: generating a second workform including a job command corresponding to the inexecutable job condition and transmitting the generated image data and the second workform to the web server.

The foregoing and/or other aspects and utilities of the present general inventive concept are achieved by a method of providing the workflow status of a job in a web server, including: generating a first workform including a plurality of job conditions necessary to perform the job; transmitting the first workform to an image forming device; receiving image data generated in the image forming device and a second workform including a job condition of the plurality of job conditions that are inexecutable in the image forming device, parsing the second workform, and performing the inexecutable job condition; generating a web page displaying a workflow status of the inexecutable job condition in real-time whenever the inexecutable job condition is processed; and providing the web page to a user terminal which has requested the job.

The foregoing and/or other aspects and utilities of the present general inventive concept are achieved by a method of informing a user of an image forming device of a current status of a job in the image forming device, including: coupling the image forming device to a web server through a network; parsing a job command into commands with job conditions executable by the image forming device and commands with job conditions non-executable by the image forming device; performing the commands with job conditions executable by the image forming device while displaying a guidance picture informing the user of the commands being performed; and sending the commands with job conditions non-executable by the image forming device to another device via the web server while displaying a guidance picture informing the user of the status of the commands not being performed by the image forming device.

The foregoing and/or other aspects and utilities of the present general inventive concept are achieved by a method of using a image forming device to scan a document to e-mail, including: parsing a workform to divide a job by dividing the job a scanning sub-job, a transforming sub-job, and a transmitting sub-job; determining that the scanning, transforming, and transmitting sub-jobs all are executable by the image forming device; generating a job command including job conditions necessary for to perform each of the scanning, transforming, and transmitting sub-jobs; and performing the scanning, transforming, and transmitting jobs based on the job command.

The foregoing and/or other aspects and utilities of the present general inventive concept are achieved by a combination of an image forming device, a user terminal, and a network to connect the image forming device, and the user terminal; wherein: the image forming device further includes an instruction parser to parse a workform including instructions to the image forming device, a discriminator to detect a non-executable instruction, a first communicator to send the a non-executable instruction to the user terminal via the network, and a display to display a guidance picture informing the user of the status of the instruction not being performed by the image forming device; and the user terminal includes a user input to edit the non-executable instruction.

A web page generator may be coupled to the network and the web page generator may include a second communicator to send the non-executable instruction to a third communicator included in the user terminal.

The foregoing and/or other aspects and utilities of the present general inventive concept are achieved by a image forming device including: a parser to parse a workform to divide a job by dividing the job a scanning sub-job, a transforming sub-job, and a transmitting sub-job; a controller to determine that the scanning, transforming, and transmitting sub-jobs all are executable by the image forming device, and to generate a job command including job conditions necessary for to perform each of the scanning, transforming, and transmitting sub-jobs; an image former to perform the scanning sub-jobs, a transformer to transform the sub-jobs, and a communicator to transmit the sub-jobs based on the job command; and a communicator to transmit a guidance picture informing a user of any non-executable sub-jobs.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
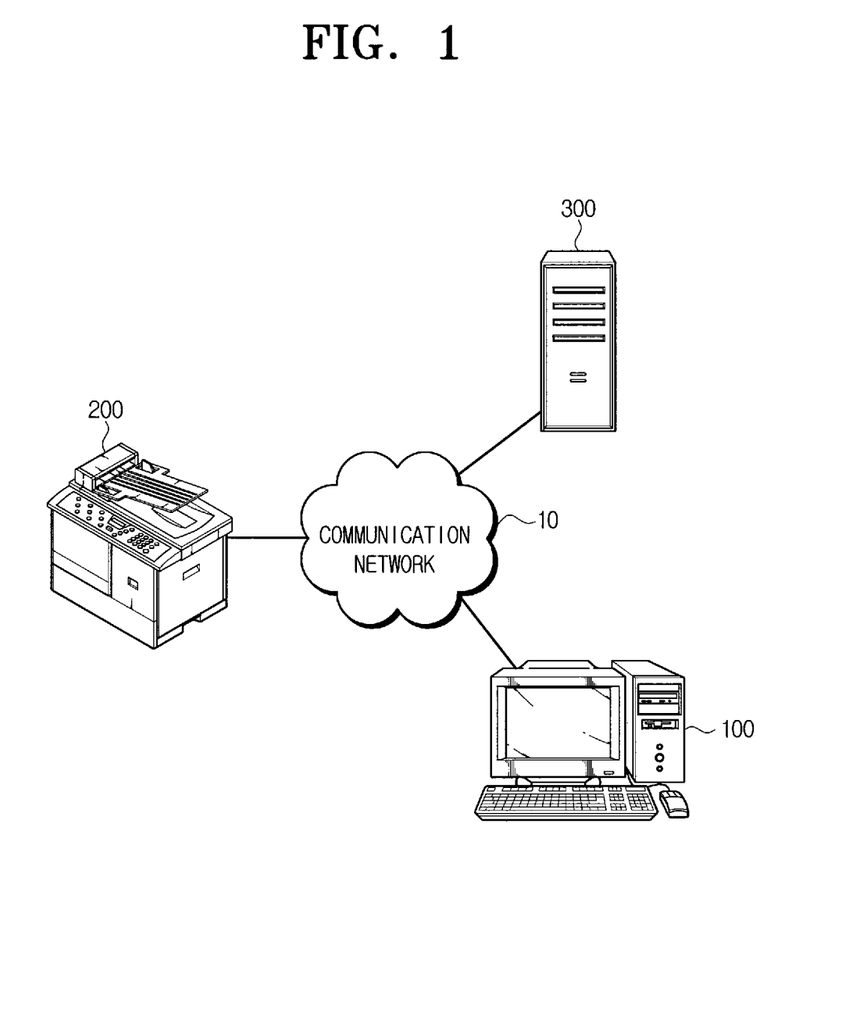
FIG. 1 is a view illustrating an image forming system providing a workflow status of a job according to an exemplary embodiment of the general inventive concept.

FIG. 1 is a view illustrating an image forming system providing a workflow status of a job according to an exemplary embodiment of the general inventive concept. Referring to FIG. 1, the image forming system includes a user terminal 100, an image forming device 200, and a web server 300.

Figure 3:
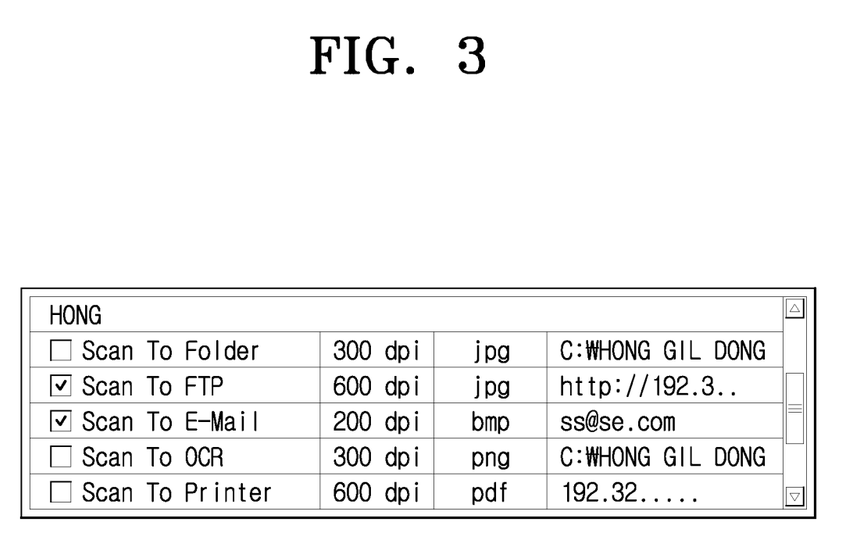
FIG. 3 is a view illustrating a web page displaying a workform list displayed on a display illustrated in FIG. 2, according to an exemplary embodiment of the general inventive concept.

The user terminal 100 may be a personal computer, a personal digital assistant (PDA), or the like, and is connected to the web server 300 and the image forming device 200 through a communication network 10. A user logs onto the web server 300 through a web browser installed in the user terminal 100 to generate or edit a workform (workform examples will be given below). A plurality of workforms may be stored in the web server 300 for each user (FIG. 3 illustrates a list of workforms).

The workform can be provided by the web server 300 so as to perform various jobs using various functions of the image forming device 200 and can include all types of information necessary to perform a job. The workform may be written out in, for example, an extensible Markup Language (XML) format and may include a plurality of pieces of information regarding a device to perform a job, an order of processing the job, and a plurality of job conditions. The user may select one of a plurality of pre-defined workforms (for example, the list of FIG. 3) so that a job can be performed automatically without setting job conditions. In FIG. 3, the list of workform names is on the left, and corresponding addresses are on the right. Job conditions are in between the workform names and the corresponding addresses.

The web server 300 stores logon information (IDs and passwords) of users pre-registered to log onto the web server 300 and a plurality of workforms set for each of the users. When a user logs onto the web server 300 through the user terminal 100, the web server 300 authenticates the user using stored information.

As mentioned above, the web server 300 also allows a user, who has been authenticated, to set or edit workforms. The web server 300 generates the workforms using a web language such as an XML. If the user selects one of the workforms through a web page corresponding to the web server 300, the web server 300 transmits the selected workform to the image forming device 200. It will be described below that a user can log onto the web server 300 through the image forming device 200 and select one workform.

If the image forming device 200 receives a workform selected by the user from the web server 300, the image forming device 200 will perform a job based on the received workform.

If the user requests a "Scan to E-Mail" job of scanning a document and e-mailing the scanned image to an outside location (such a job is illustrated in the list of FIG. 3), the job "Scan to E-Mail" is divided into, for example, a scanning job, a file transforming job, and a transmitting job. Conditions of the scanning job may include resolution, size, scanning direction, etc. Conditions of the file transforming job may include an extension name of a file, a name of the file, a compression amount, etc. Conditions of the transmitting job may include an e-mail address to which a document is to be transmitted, a transmission completion time, etc.

The image forming device 200 performs operations related to forming image data such as scanning, printing, fax data transmission, and the like. The image forming device 200 may be, for example, a scanner, a printer, a facsimile, or a multifunctional device.

The communication network 10 may be established by a cable connected to a general parallel port, a cable connected to a universal serial bus (USB) port, an internet network established by a hub and a local area network (LAN), or the like.

Figure 2:
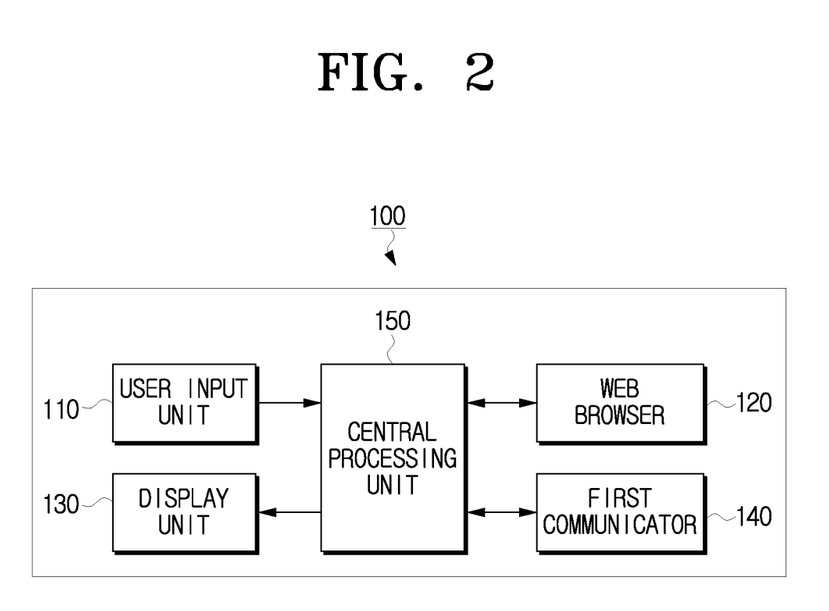
FIG. 2 is a block diagram illustrating a user terminal illustrated in FIG. 1, according to an exemplary embodiment of the general inventive concept.

FIG. 2 is a block diagram illustrating the user terminal 100 illustrated in FIG. 1, according to an exemplary embodiment of the general inventive concept, and FIG. 3 is a view illustrating a web page related to setting of workforms on a display illustrated in FIG. 2, according to an exemplary embodiment of the general inventive concept. Referring to FIGS. 1 and 2, the user terminal 100 includes a user input unit 110, a web browser 120, a display unit 130, a first communicator 140, and a central processing unit 150. The user terminal 100 illustrated in FIG. 2 may be a personal computer. Blocks of the user terminal 100 unrelated to the general inventive concept are not illustrated.

The user input unit 110 is a user interface such as a keyboard or a mouse and the input unit 110 outputs a signal to select and request functions supported by the user terminal 100. According to the general inventive concept, a user that logs onto the web server 300 through the user input unit 110 may write or edit workforms related to a job.

The web browser 120 operates as a web client which outputs a signal to request a web page. The web browser 120 may be an explorer.

If the web browser 110 is activated, and then a web path of the web server 300 is input through the user input unit 110, the first communicator 140 attempts a connection with the web server 300 corresponding to the web path.

A user that is connected to the web server and is authenticated is allowed to write a new workform through a web page provided by the web server 300, or to edit a previously-written workform.

Figure 5A:
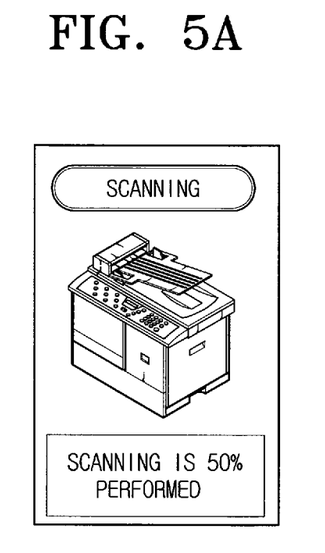
FIGS. 5A through 5C are views illustrating guidance pictures displayed on a display panel illustrated in FIG. 4 and related to a scanning work, according to an exemplary embodiment of the general inventive concept.
Figure 5B:
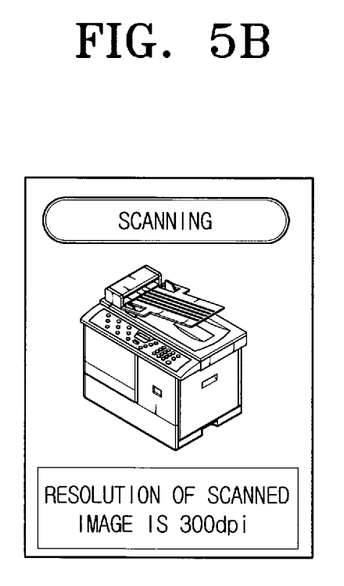
Figure 5C:
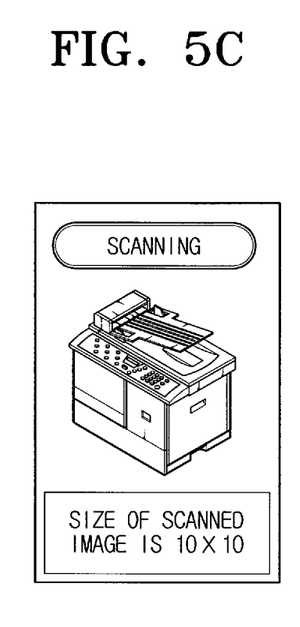

The display unit 130 is controlled by the central processing unit 150 to display the web page provided by the web server 300. In more detail, the display unit 130 displays a web page transmitted from the web server 300. The web page may display a workform list as illustrated in FIG. 3 or a guidance picture indicating a workflow status of a job which is currently being processed in the image forming device 200 or the web server 300 (FIGS. 5A-5C are examples of guidance pictures). The web page displaying the guidance picture will be described in detail later.

The first communicator 140 transmits a connection signal to the web server 300 and receives a plurality of web pages from the web server 300. For this purpose, the first communicator 140 includes a port, such as a LAN port, to communicate with the web server 300.

Figure 4:
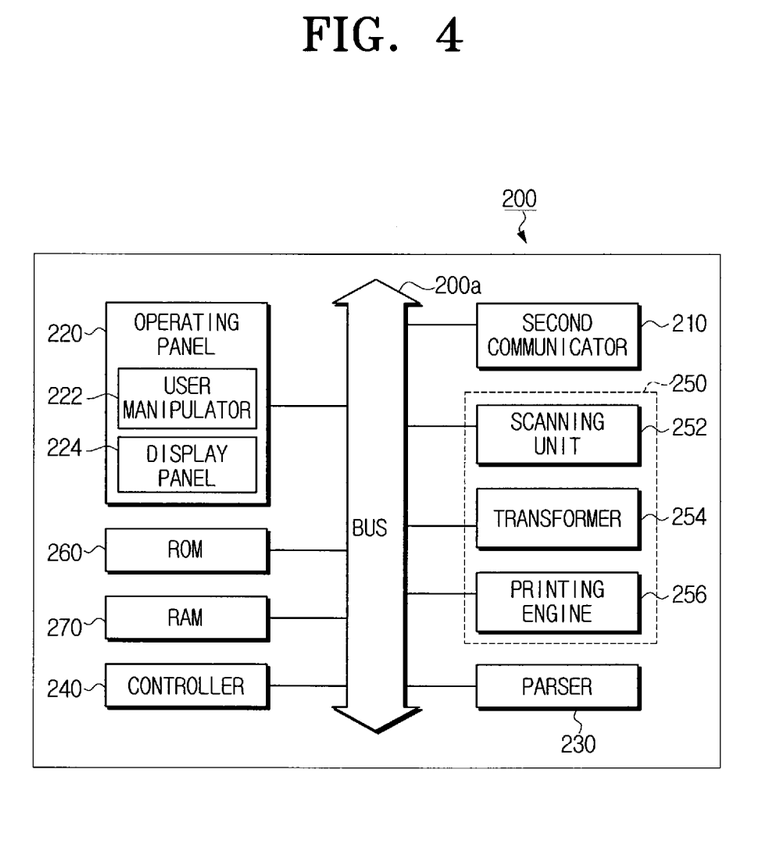
FIG. 4 is a block diagram illustrating an image forming device illustrated in FIG. 1, according to an exemplary embodiment of the general inventive concept.

FIG. 4 is a block diagram illustrating an exemplary image forming device 200 illustrated in FIG. 1. Referring to FIGS. 1 through 4, the image forming device 200 includes a second communicator 210, an operating panel 220, a parser 230, a controller 240, an image former 250, a read only memory (ROM) 260, and a random access memory (RAM) 270. A bus 200a is a data transmission path through which data is transmitted between the above-described blocks.

The second communicator 210 communicates with the user terminal 100 and the web server 300 through the communication network 10. The second communicator 210 also supports interfaces between the image forming device 200 and other image forming devices (not illustrated). Thus, the image forming device 200 may transmit a scanned image to another image forming device through the second communicator 210 by an e-mail or a file transfer protocol (FTP).

The operating panel 220 includes a user manipulator 222 and a display panel 224. The user manipulator 222 is a user interface which outputs signals to manipulate functions that are supported by the image forming device 200 to the controller 240 which will be described later. For this purpose, the user manipulator 222 may include various function keys and a touch screen to input letters, numerals, and directions.

If a user manipulates the user manipulator 222 to log into the web server 300, the web server 300 transmits a workform list stored for the user to the image forming device 200. The workform list transmitted through the second communicator 210 is displayed on the display panel 224 (FIG. 3 is an example of a workform list). If the user manipulates the user manipulator 222 to select a first workform from the workform list, the first workform is downloaded from the web server 300.

The display panel 224 is controlled by the controller 240 to display a workflow status of a job performed by the image forming device 200 using predetermined letters, symbols, images, and the like. The display panel 224 is generally a large-sized liquid crystal display (LCD). A feature of the general inventive concept is that the display panel 224 displays to the user guidance pictures that illustrate workforms necessary to perform jobs requested by the user and workflow status of the requested jobs.

If an operation such as "Scanning on" is requested through the user manipulation 222, the parser 230 parses the downloaded first workform. The parsed first workform is a workform necessary to perform a job requested by a user. The parser 230 outputs information to the controller 240 indicating whether job conditions necessary to perform the job are executable within the image forming device 200.

The controller 240 controls an overall operation of the image forming device 200 using a control program stored in the ROM 260. In the general inventive concept, the controller 240 determines whether the job conditions are executable according to the result of parsing the first workform. If the controller 240 determines that the job conditions are executable, the controller 240 generates a job command including a plurality of job conditions (parameters) from the parsed first workform and performs a job corresponding to the selected first workform based on the generated job command. In other words, the job command includes job conditions necessary to perform a job.

Whenever the job conditions of the job command are processed, the controller 240 also generates guidance pictures displaying the workflow status of the job and controls the display panel 224 to display the guidance picture. In other words, whenever the job conditions of the job command are processed, the controller 240 generates guidance pictures respectively corresponding to the job conditions in real-time and outputs the guidance pictures to the display panel 224. Thus, the display panel 224 displays guidance pictures displaying a detailed workflow of a currently processed job in real-time.

For example, if a job to be performed is "Scan to E-Mail," the job is divided, according to a parsed workform, into a scanning job, a transforming job, and a transmitting job. In this example, the controller 240 will determine that the scanning, transforming, and transmitting jobs all are executable in the image forming device 200, and the controller 240 also will generate a job command including the job conditions necessary to perform each of the scanning, transforming, and transmitting jobs, and will control a scanning unit 252, a transformer 254, and the second communicator 210 to respectively perform the scanning, transforming, and transmitting jobs based on the job command.

While the scanning job is performed, the controller 240 sequentially generates guidance pictures displaying, for example, the scanning status, the resolution and size of a scanned image, the direction (or, orientation) and size of a scanned document, and/or the like, and outputs these guidance pictures to the display panel 224. When the transforming job is performed, the controller 240 sequentially generates guidance pictures displaying transformation status and compression status, the capacity of a file, the name of a transformed file, and the like, and outputs the guidance pictures to the display panel 224. Then, when the transmitting job is performed, the controller 240 sequentially generates guidance pictures to display the transmission status, whether the transmission has succeeded, and the like and outputs the guidance pictures to the display panel 224.

FIGS. 5A through 5C are views illustrating examples of guidance pictures displayed on the display panel illustrated in FIG. 4 and related to the scanning job, according to an exemplary embodiment of the present general inventive concept. Referring to FIG. 5A, numerals displayed on a guidance picture on the display panel 224 are changed according to the scanning status (for example, the guidance picture might next read, "SCANNING IS 60% PERFORMED" or "SCANNING IS 75% PERFORMED"). Thus, a user may easily check a workflow of current scanning. Also, the user may check the resolution of a scanned image through a guidance picture of FIG. 5B displayed on the display panel 224 and the size of the scanned image through a guidance picture such as that illustrated in FIG. 5C.

Guidance pictures related to the transforming and transmitting jobs are differently displayed according to the job conditions.

If the controller 240 determines that one of the job conditions is inexecutable in the image forming device 200, the controller 240 generates a new job command corresponding to the inexecutable job condition and then a second workform that includes the newly-generated job command. The controller 240 also controls the second communicator 210 to transmit the newly-generated second workform and image data generated by the image former 250 to the web server 300. The controller 240 also generates a guidance picture related to the inexecutable job condition and sends the guidance picture to the display panel 224. As a result, the user recognizes which job conditions are inexecutable in the image forming device 200.

Examples of job conditions that might be inexecutable in the image forming device 200 include "OCR," "Scan to Color printing," etc. "OCR" stands for optical character recognition. "Scan to Color printing" means color printing of the scanned image.

If a job requested by the user is "Scan to OCR," the job may be divided into scanning, transforming, and OCR jobs. In this case, the controller 240 determines that the OCR job is inexecutable in the image forming device 200, generates a job command corresponding to the OCR job, transforms the generated job command into a second workform format, and transmits the second workform and a file transformed into a predetermined format to the web server 300. The web server 300 parses the second workform, transforms the transmitted file into a text form according to the result of parsing the second workform. The web server 300 may store the text, or request that the image forming apparatus 200 print the text again. Alternatively, the web server 300 may transmit the text to the user terminal 100.

If a job requested by the user is "Scan to Color printing," the job may be divided into scanning, transforming, and color printing jobs. if a printing engine 256 does not support color printing, the controller 240 determines that the color printing job is inexecutable by the image forming device 200. The controller 240 also generates a new job command related to the color printing, generates a second workform including the generated job command, and transmits the second workform and a file transformed into a predetermined format to the web server 300. The web server 300 transmits the file transmitted thereto to a network printer (not illustrated) supporting color printing according to the result of parsing the second workform so as to color print the file.

The image former 250 generates image data of an input document and performs jobs related to the image data. The image former 250 includes the scanning unit 252, the transformer 254, and the printing engine 256.

The scanning unit 252 performs the scanning job based on the job command corresponding to the scanning job, wherein the job command is provided from the controller 240. In other words, the scanning unit 252 scans the input document to generate a scanned image. The generated scanned image is either stored in the RAM 270 or printed by the printing engine 256, depending on the type of job. For example, if a type of a job requested by the first workform downloaded from the web server 300 is "Scan to E-Mail," the scanning unit 252 outputs the generated scanned image to the transformer 254.

The transformer 254 acts based on the job command corresponding to the transforming job, where the job command is provided from the controller 240. In other words, the transformer 254 transforms the scanned image into a file format according to the job conditions included in the job command. For example, one of job conditions of a workform might be to transform a scanned image into a format of "*.jpg," in which case the transformer 254 transforms the scanned image into a file having an extension "jpg." The name of the file may either be designated by a user or randomly set by the controller 240. Other examples of the extension may include "pdf," "gif," and the like. The transformer 254 outputs the file to the second communicator 210 so as to transmit the file to a designated mail address.

The printing engine 256 performs the printing job based on the job command corresponding to the printing job, where the job command is provided from the controller 240. In other words, the printing engine 256 prints data of the file generated by the transformer 254 according to job conditions of the job command.

The ROM 260 stores various control programs necessary to realize the functions of the image forming device 200, and the RAM 270 stores various types of data generated when the operation of the image forming device 200 is performed.

Figure 6:
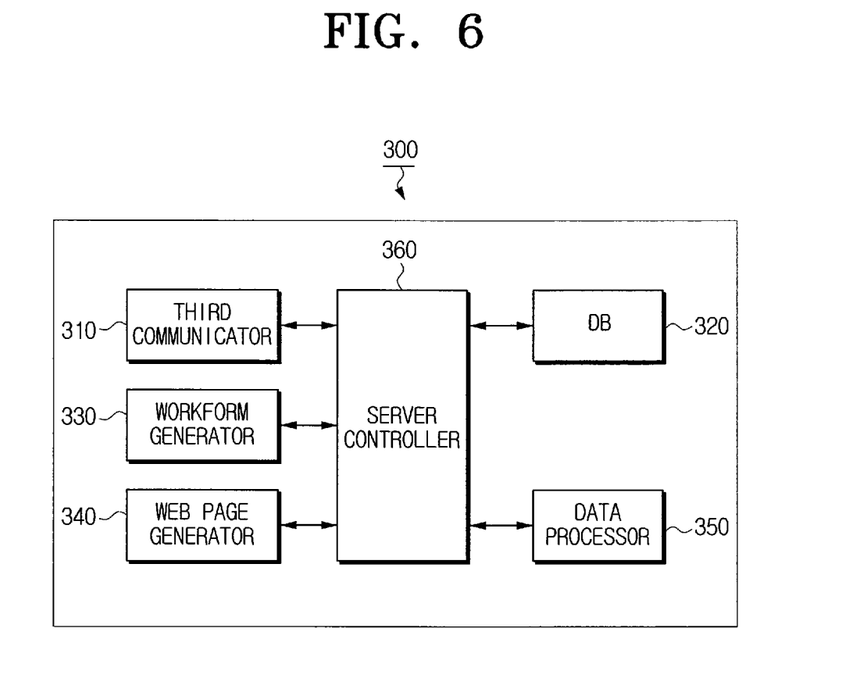
FIG. 6 is a block diagram illustrating a web server illustrated in FIG. 1, according to an exemplary embodiment of the general inventive concept.

FIG. 6 is a block diagram illustrating the web server 300 illustrated in FIG. 1, according to an exemplary embodiment of the general inventive concept. Referring to FIGS. 1 through 6, the web server 300 includes a third communicator 310, a database (DB) 320, a workform generator 330, a web page generator 340, a data processor 350, and a server controller 360.

The third communicator 310 communicates with the user terminal 100 and the image forming device 200 through the communication network 10. The third communicator 310 receives the ID and a password of a user from the user terminal 100 or the image forming device 200 and provides the ID and the password to the server controller 260. The third communicator 310 transmits to the user terminal 100 a web page related to writing or editing of a workform and also a web page guiding workflow status of a job. The third communicator 310 transmits to the image-forming device 200 the workform list stored for the user and the first workform of the workform list selected at the image forming device 200. The image forming device 200 performs image data jobs based on the first workform.

The database DB 320 stores the ID and password of the user registered in the web server 300 through a subscribing process. The DB 320 also stores at least one workform written out for each user.

The workform generator 330 generates a workform including a plurality of job conditions necessary for jobs related to forming of an image using a designated language. For example, the workform generator 330 generates the workform using an XML format. If the user logs into the web server 300 and then requests writing or editing of a workform through a web page of the web server 300, the web page generator 340, which will be described later, generates a web page related to the workform.

If the user requests editing of a stored workform or writing of a new workform including new job conditions through the web page related to the workform, the workform generator 330 generates an edited workform or a new workform and stores the edited workform or the new workform in the DB 320. The web page generator 340 generates a web page related to the web server 300.

Figure 7:
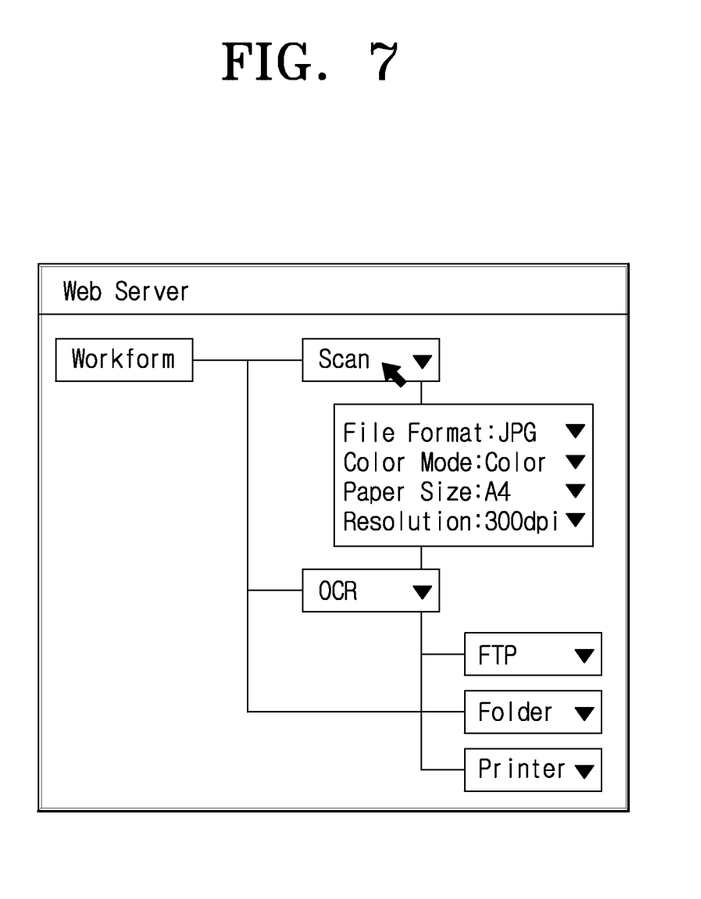
FIG. 7 is a view illustrating a workform web page provided to a user terminal by the web server illustrated in FIG. 1, according to an exemplary embodiment of the general inventive concept.

In the general inventive concept, the web page generator 340 generates an initial web page to log into the web server 300, a workform web page to write out or edit a workform as illustrated in FIG. 7, and a web page including at least one guidance picture that guides a workflow status of a predetermined job performed in the image forming device 200 or the web server 300. Then, web page generator 340 transmits the generated web pages to the user terminal 100 of the user who has logged into the web server 300.

The web page generator 340 also generates, in real-time, a web page guiding the workflow status corresponding to a job condition which is inexecutable by the image forming device 200 in real-time, and transmits the web page to the user terminal 100.

Referring to FIG. 7, if a workform web page is displayed on the display unit 130 of the user terminal 100, a user may manipulate the user input unit 110 to write out or edit a plurality of workforms and store a final workform under the name of the user.

If a job command includes a job condition which is inexecutable in the image forming device 200, a second workform including the job command with the inexecutable job condition can be set to the third communicator 310 when a requested job is performed in the image forming device 200. The data processor 350 parses the second workform to generate the job command that includes the inexecutable job condition and performs the job condition which is inexecutable in the image forming device 200, based on the generated job command.

The server controller 360 controls the third communicator 310 to transmit a web page generated on a web page generator 340 to the user terminal 100 of a user, when the user has logged into the web server 300, has been checked, and has requested a job of the web server 300 through the communications network 10.

Figure 8:
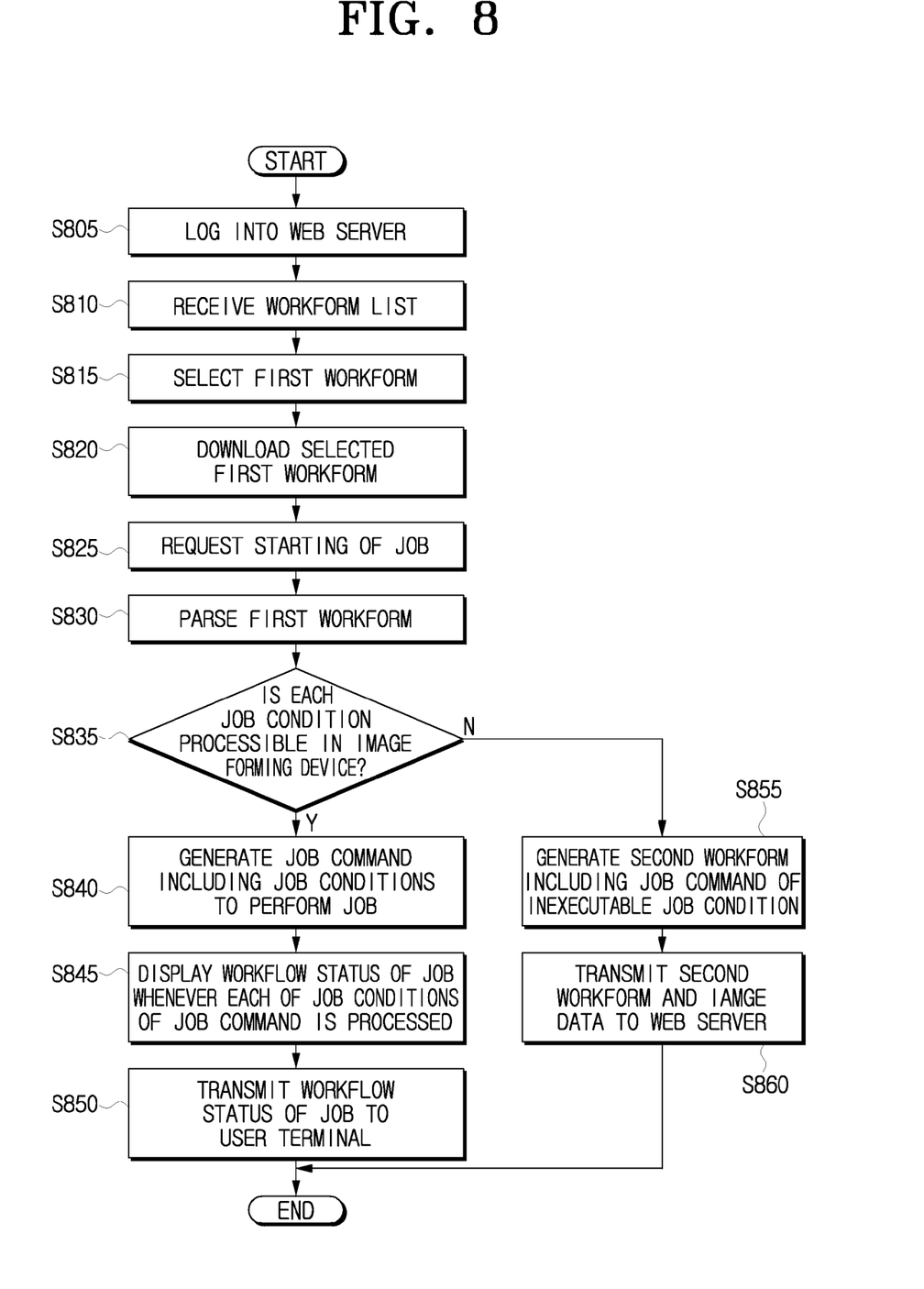
FIG. 8 is a flowchart illustrating a method of providing a workflow status of a job in the image forming device illustrated in FIG. 1, according to an exemplary embodiment of the general inventive concept.

FIG. 8 is a flowchart illustrating a method of providing a workflow status of a job in the image forming device 200 illustrated in FIG. 1, according to an exemplary embodiment of the general inventive concept. Referring to FIGS. 1 through 8, in operation S805, a user manipulates the user manipulator 222 of the image forming device 200 to log into the web server 300. In other words, in operation S805, if logging into the web server 300 is requested from the user manipulator 222, the controller 240 controls the second communicator 210 to log into the web server 300.

In operation S810, a workform list of the user is received from the web server 300 and displayed on the display panel 224. In operation S815, the user manipulates the user manipulator 222 to select a workform (hereinafter referred to as a first workform) from the workform list (e.g., FIG. 3). In other words, the user selects the first workform from a plurality of workforms including a job condition satisfying a desired job.

In operation S820, the second communicator 210 downloads the selected first workform from the web server 300 and temporarily stores the first workform in a memory such as the RAM 270.

In operation S825, a document is put on the scanning unit 252, and then the start of a job is requested from the user manipulator 222, i.e., scanning is requested from the user manipulator 222. In operation S830, the parser 230 parses the temporarily stored first workform and outputs the result of parsing the temporarily stored first workform to the controller 240.

In operation S835, the controller 240 determines whether job conditions of the parsed first workform are executable in the image forming device 200, based on the parsed first workform. If it is determined in operation S835 that the job conditions are executable in the image forming device 200, the controller 240 generates job commands respectively including the job conditions from the parsed first workform and performs the job based on the generated job commands in operation S840.

In operation S845, the controller 240 may cause the guidance picture to be generated and then displayed through the display panel 224 whenever the job conditions for the job command are processed, that is, whenever the job is performed based on the job conditions included in the job command. The guidance picture shows the processing status of the job, and it is generated according to each job condition and on a real-time basis.

In operation S850, the controller 240 writes out the guidance picture generated in operation S845 in an XML format and transmits the guidance picture to the web server 300.

If it is determined in operation S835 that the job conditions of the parsed first workform are inexecutable in the image forming device 200, the controller 240 generates a job command including the inexecutable job conditions and generates a second workform including the generated job command in operation S855. In operation S860, the controller 240 transmits the second workform generated in operation S855 and a scanned image or image data transformed into a file having a predetermined format to the web server 300.

In operation S850 or S860, the web server 300 parses the guidance picture having the XML format to generate a web page displaying the guidance picture in real-time and transmits the web page to the user terminal 100. As a result, a user may further minutely check a workflow status of a current job on the display unit 130 of the user terminal 100.

Figure 9:
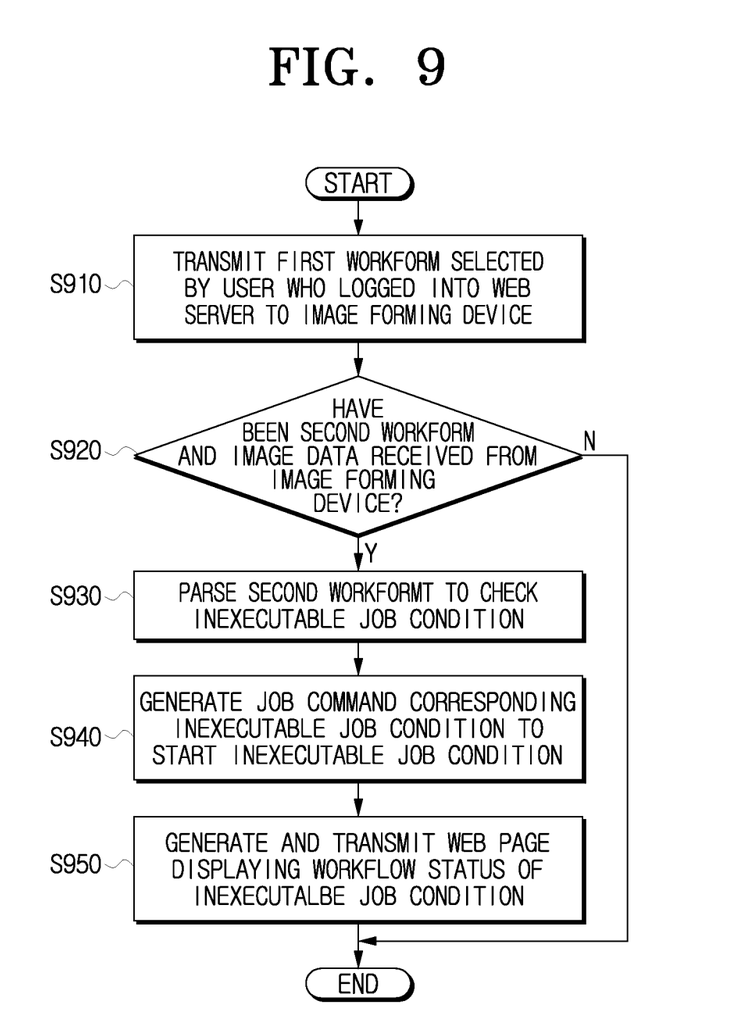
FIG. 9 is a flowchart illustrating a method of providing a workflow status of a job in the web server illustrated in FIG. 1.

FIG. 9 is a flowchart illustrating a method of providing a workflow status of a job in the web server 300 illustrated in FIG. 1, according to an exemplary embodiment of the general inventive concept. Referring to FIGS. 1 through 9, in operation S910, a first workform is selected from a plurality of workforms stored in the web server 300 by a user who has logged into the web server 300 through the image forming device 200, and the server controller 360 controls the third communicator 310 to transmit the first workform having an XML format to the image forming device 200.

In operation S920, a second workform and a scanned image or image data transformed into a file having a predetermined format are received from the image forming device 200 after a predetermined period of time elapses. In operation S930, the data processor 350 parses the received second workform to check for job conditions which are inexecutable in the image forming device 200. In other words, the data processor 350 determines which job conditions are executed in the web server 300.

In operation S940, the data processor 350 generates a job command including the checked job conditions from the parsed second workform and executes job conditions which are inexecutable in the image forming device 200, based on the generated job command.

In operation S950, the controller 240 generates a web page indicating a workflow status of a job whenever the job conditions of the job command are executed in operation S940 and transmits the web page to the user terminal 100.

As described above, in an image forming device and a web server providing a workflow status of a job and a method of providing the workflow status of the job in the image forming device and the web server according to exemplary embodiments of the general inventive concept, a workform written in an XML can be parsed to generate a job command. Whenever job conditions of the job command are processed, a workflow status of a currently performed job can be visually displayed in real-time.

This is because items to be substantially processed in the image forming device are described in the job command, and thus the image forming device is capable of checking the workflow of the job in advance. Thus, a user can determine that the job is accurately executed in real-time through a display panel of the image forming device or a user terminal. Also, the user can check which step the job fails at and thus further quickly solve the problem.

In addition, processing of jobs, which are not processed in the image forming device, can be requested of the web server. A web page or a guidance picture in XML format indicating the workflow status of a job that is being processed in the web server can be provided in real-time. Thus, if the user logs into the web server through the user terminal, the user can check the web page provided from the web server or the guidance picture transmitted from the web server through an LCD window of the image forming device so as to check a workflow status of a current job.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming device to provide a workflow status of a job to a user, the image forming device comprising:
   an operating panel to allow a user to log on to a web server;
   a communicator to receive a workform list, associated with the user, from the web server through a communication network, the workform list including a first workform to perform a plurality of jobs using respective functions of the image forming device, wherein the plurality of jobs each comprise a plurality of job conditions to perform each respective one of the plurality of jobs;
   an image former to generate image data of a document to perform the job;
   a parser to parse the first workform; and
   a controller to control the image former to perform the plurality of jobs based on the parsed first workform and to generate guidance pictures that indicate the workflow status of a current job of the plurality of jobs.

2. The image forming device as claimed in claim 1, wherein the controller controls the communicator to transmit the generated guidance pictures to the web server.

3. The image forming device as claimed in claim 2, wherein the web server generates the guidance pictures as web pages which are recognizable to the user.

4. The image forming device as claimed in claim 1, wherein if the plurality of job conditions comprise a job condition that is inexecutable by the image former, the controller generates a second workform comprising the inexecutable job condition and transmits the generated image data generated by performing at least one of the job conditions of the first work form that is executable by the image former and the second workform to the web server.

5. The image forming device as claimed in claim 1, wherein the image former comprises:
   a scanning unit to scan the document to generate a scanned image; and
   a transformer to transform the scanned image into a file having a format specified by a job condition of the first workform.

6. The image forming device as claimed in claim 5, wherein the job comprises a scanning job of scanning the document to generate the scanned image, a transforming job of transforming the scanned image into the file, and a transmitting job of transmitting the file to the web server.

7. The image forming device as claimed in claim 6, further comprising:
   a display, and wherein the guidance pictures are displayed in real-time.

8. The image forming device as claimed in claim 4, wherein the image forming device transmits the generated image data and the second workform to the web server to perform the inexecutable job condition generated from the second workform, and to generate a guidance picture to guide a workflow status of the inexecutable job condition as a web page, and to transmit the web page to a user terminal.

9. The image forming device as claimed in claim 8, wherein when the inexecutable job condition is processed, the web server generates a web page to display contents of the processed inexecutable job condition.

10. The image forming device as claimed in claim 1, further comprising:
   a display to display the guidance picture whenever each of the job conditions is processed.

11. A web server to provide a workflow status of a job, comprising:
   a workform generator to generate a first workform comprising a plurality of jobs, the plurality of jobs each comprising a plurality of job conditions to perform a job, the first workform to perform one or more jobs using one or more respective functions of an image forming device and including all types of information to perform the job;
   a communicator to transmit the first workform to the image forming device;
   a data processor to receive, from the image forming device, image data generated by performing at least one of the job conditions of the first workform that is executable by the image forming device and a second workform generated when an inexecutable job condition that is inexecutable by the image forming device due to the inexecutable job condition is found, the second workform comprising the inexecutable job condition of the plurality of job conditions inexecutable in the image forming device from the image forming device through the communicator, to parse the second workform, and to perform the inexecutable job condition;
   a web page generator to generate a web page to display a workflow status of the inexecutable job condition in real-time whenever the inexecutable job condition is processed; and
   a server controller to control the communicator to provide the web page to a user terminal which has requested the job.

12. A method of providing a workflow status of a job in an image forming device, comprising:
   logging a user onto a web server;
   receiving a workform list, associated with the user, from the web server through a communication network, the workform list including a first workform to perform a plurality of jobs using respective functions of the image forming device, wherein the plurality of jobs each comprise a plurality of job conditions to perform each respective one of the plurality of jobs;
   parsing the first workform if generation of image data of a document is requested;
   performing a job related to the generation of the image data based on the parsed first workform; and
   generating and displaying a guidance picture to guide a workflow status of a current job of the plurality of jobs.

13. The method as claimed in claim 12, further comprising:
   transmitting a guidance picture generated whenever the job is processed to the web server.

14. The method as claimed in claim 13, comprising:
   generating in the web server the guidance picture as a web page which is recognizable to a user and transmitting the web page to a user terminal.

15. The method as claimed in claim 12, further comprising:
   if the plurality of job conditions comprise a job condition that is inexecutable in the image forming device, according to a result of parsing the first workform,
   generating a second workform comprising a job command corresponding to the inexecutable job condition and
   transmitting the generated image data generated by performing at least one of the job conditions of the first work form that is executable by the image forming device and the second workform to the web server.

16. The method as claimed in claim 12, wherein the job comprises a scanning job of scanning a document to generate a scanned image, a transforming job of transforming the scanned image into a file having a format which can be recognized in the web server, and a transmitting job of transmitting the file to the web server.

17. The method as claimed in claim 16 comprising:
displaying the guidance picture in real-time.

18. The method as claimed in claim 12, comprising:
transmitting to the web server the image data and a second workform, to perform an inexecutable job condition of the job command generated from the first workform, to generate a guidance picture guiding a workflow status of the inexecutable job condition as a web page, and to transmit the web page to the user terminal.

19. The method as claimed in claim 18, wherein when the inexecutable job condition is processed, the web server generates a web page to display contents of the processed inexecutable job condition.

20. A method of providing a workflow status of a job in a web server, comprising:
generating a first workform comprising a plurality of jobs, wherein each job comprises a plurality of job conditions to perform the job, the first workform to perform one or more jobs using one or more respective functions of an image forming device and including all types of information to perform the job;
transmitting the first workform to the image forming device;
receiving image data generated in the image forming device by performing at least one of the job conditions of the first work form that is executable by the image forming device and a second workform generated when an inexecutable job condition that is inexecutable by the image forming device due to the inexecutable job condition is found, the second workform comprising the inexecutable job condition of the plurality of job conditions inexecutable in the image forming device from the image forming device, parsing the second workform, and performing the inexecutable job condition;
generating a web page displaying a workflow status of the inexecutable job condition in real-time whenever the inexecutable job condition is processed; and
providing the web page to a user terminal which has requested the job.

21. A method of informing a user of an image forming device of a current status of a job in the image forming device, comprising:
coupling the image forming device to a web server through a network;
parsing a workform comprising a plurality of jobs, wherein each job comprises a plurality of job conditions, into commands with first job conditions executable by the image forming device and commands with second job conditions non-executable by the image forming device due to the second job conditions;
performing the commands with the first job conditions executable by the image forming device while displaying a guidance picture informing the user of the commands being performed; and
sending the commands with the second job conditions non-executable by the image forming device to another device via the web server while displaying a guidance picture informing the user of the status of the commands not being performed by the image forming device.

22. In combination: an image forming device, a user terminal, and a network to connect the image forming device and the user terminal; wherein:
the image forming device further comprises an instruction parser to parse a workform to perform a plurality of jobs, wherein the plurality of jobs each comprise a plurality of job conditions to perform each respective one of the plurality of jobs using respective functions of the image forming device, and the job conditions are used to create instructions to the image forming device, a discriminator to detect from the instructions an executable instruction and a non-executable instruction that is non-executable by the image forming device, a first communicator to send the non-executable instruction to the user terminal via the network, and a display to display a guidance picture informing the user of the status of the executable instruction being performed by the image forming device and the non-executable instruction not being performed by the image forming device; and wherein
the user terminal comprises a user input to edit the non-executable instruction.

23. The combination according to claim 22, further comprising a web page generator coupled to the network; wherein
the web page generator comprises a second communicator to send the non-executable instruction to a third communicator comprised in the user terminal.

* * * * *